United States Patent
Chang et al.

(10) Patent No.: US 10,518,522 B2
(45) Date of Patent: Dec. 31, 2019

(54) PRINTING METHOD FOR SHIELDING COMPONENT OF 3D MODEL, AND CALCULATING METHOD FOR PRINTING START POINT OF SHIELDING COMPONENT

(71) Applicants: XYZPRINTING, INC., New Taipei (TW); KINPO ELECTRONICS, INC., New Taipei (TW)

(72) Inventors: Yu-Chuan Chang, New Taipei (TW); Yu-Ting Huang, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 167 days.

(21) Appl. No.: 15/600,187

(22) Filed: May 19, 2017

(65) Prior Publication Data
US 2018/0207888 A1    Jul. 26, 2018

(30) Foreign Application Priority Data
Jan. 26, 2017 (CN) .......................... 2017 1 0061781

(51) Int. Cl.
| | |
|---|---|
| B29C 67/00 | (2017.01) |
| B33Y 10/00 | (2015.01) |
| G06F 17/40 | (2006.01) |

(52) U.S. Cl.
CPC .............. *B33Y 10/00* (2014.12); *G06F 17/40* (2013.01)

(58) Field of Classification Search
CPC ......... B33Y 10/00; B33Y 50/00; B29C 64/40; B29C 64/386; G06F 17/40
See application file for complete search history.

(56) References Cited

U.S. PATENT DOCUMENTS

| | | | |
|---|---|---|---|
| 2016/0136887 A1* | 5/2016 | Guillemette .......... | B29C 69/001 428/375 |
| 2017/0176979 A1* | 6/2017 | Lalish ..................... | G06F 17/50 |
| 2017/0274575 A1* | 9/2017 | Meshorer ........... | G05B 19/4097 |

FOREIGN PATENT DOCUMENTS

WO     2016030883 A1    3/2016

OTHER PUBLICATIONS

Office Action dated Oct. 21, 2019 of the corresponding China patent application.

* cited by examiner

*Primary Examiner* — Kenneth M Lo
*Assistant Examiner* — David J Wynne
(74) *Attorney, Agent, or Firm* — Chun-Ming Shih; HDLS IPR Services

(57) ABSTRACT

A printing method for shielding component adopted to print a shielding component (2) of a 3D model (20) having multiple printing layers (11) is disclosed. The method first obtains all candidate points of first layer of the shielding component (2) and chooses one of the candidate points as a start point (211) of the first layer according to a default rule, and prints the first layer from the chosen start point (211). Next, the method obtains all candidate points of next layer of the shielding component (2) and chooses one of the candidate points of the next layer which is closest to the start point (211) of last layer to be printed as a start point of the next layer, and prints the next layer from the chosen start point.

9 Claims, 10 Drawing Sheets

PRINTING METHOD FOR SHIELDING COMPONENT OF 3D MODEL, AND CALCULATING METHOD FOR PRINTING START POINT OF SHIELDING COMPONENT

BACKGROUND OF THE INVENTION

Field of the Invention

The present disclosure relates to printing and calculating method for a printing start point of a 3D model, especially to a printing method for a shielding component of a 3D model, and a calculating method for a printing start point of the shielding component.

Description of Prior Art

In view of the mature 3D printing technology, and reduced volume and price of various 3D printers, the 3D printer develops rapidly in recent years.

Generally, a 3D model is formed by multiple printing layers. A 3D printer printing the 3D model prints a printing layer first, then prints next printing layer upward, thus stacks multiple printing layers to be the required 3D model.

The 3D printer printing a printing layer mainly starts from a printing start point of the printing layer, and prints to a printing endpoint of the printing layer. In other words, each printing layer has a printing start point.

The aforementioned printing start point is not chosen under limitation of relative technology, thus position of the printing start point of each printing layer may be different. After the multiple printing layers are stacked, the multiple printing start points on the printing layers will not be continuous. In this way, seen from appearance, the 3D model is obviously rough at the printing start points, and thus aesthetics of the 3D model is reduced.

SUMMARY OF THE INVENTION

The present disclosure provides a printing method for a shielding component of a 3D model and a calculating method for a printing start point of a 3D model, making printing start points of each printing layer of the shielding component be more continuous, and increasing aesthetics of the printed shielding component.

In an exemplary embodiment of the present disclosure, the method obtains all candidate printing points of the first layer of a shielding component, and chooses one of the candidate printing points to be a printing start point of the first layer according to a default rule, then starts printing the first layer from the printing start point. Next, all candidate printing points of next layer of the shielding component are obtained, and a candidate printing point closest to the printing start point of the last layer is used to be a printing start point of the current printing layer, and printing of the current printing layer is started from the printing start point. Besides, the method keeps determining the printing start point of the next layer according to the same rule, till printing of the shielding component is finished directly.

Compared to the relative technology, each exemplary embodiment of the present disclosure when a 3D printer prints a shielding component, makes each printing start point of each printing layer of the shielding component be more continuous, and thus makes the printed shielding component be more aesthetic.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

An exemplary embodiment of discloses printing method for the 3D printer printing a shielding component of a 3D model. Specifically, in an exemplary embodiment, the shielding component is meant to be part of the 3D model seen by the user through eyes, and the 3D model is mainly formed by one or more shielding components.

For example, only the outer surface of a solid column can be seen through eyes, thus the outer surface of the column is a shielding component. Both outer edge and inner edge of a hollow cup can be seen through the eyes, thus the outer edge and inner edge of a hollow cup are two different shielding components. Each exemplary embodiment of the present disclosure discloses a printing method for controlling the 3D printer to perform a printing action to the aforementioned shielding component.

Figure 1:
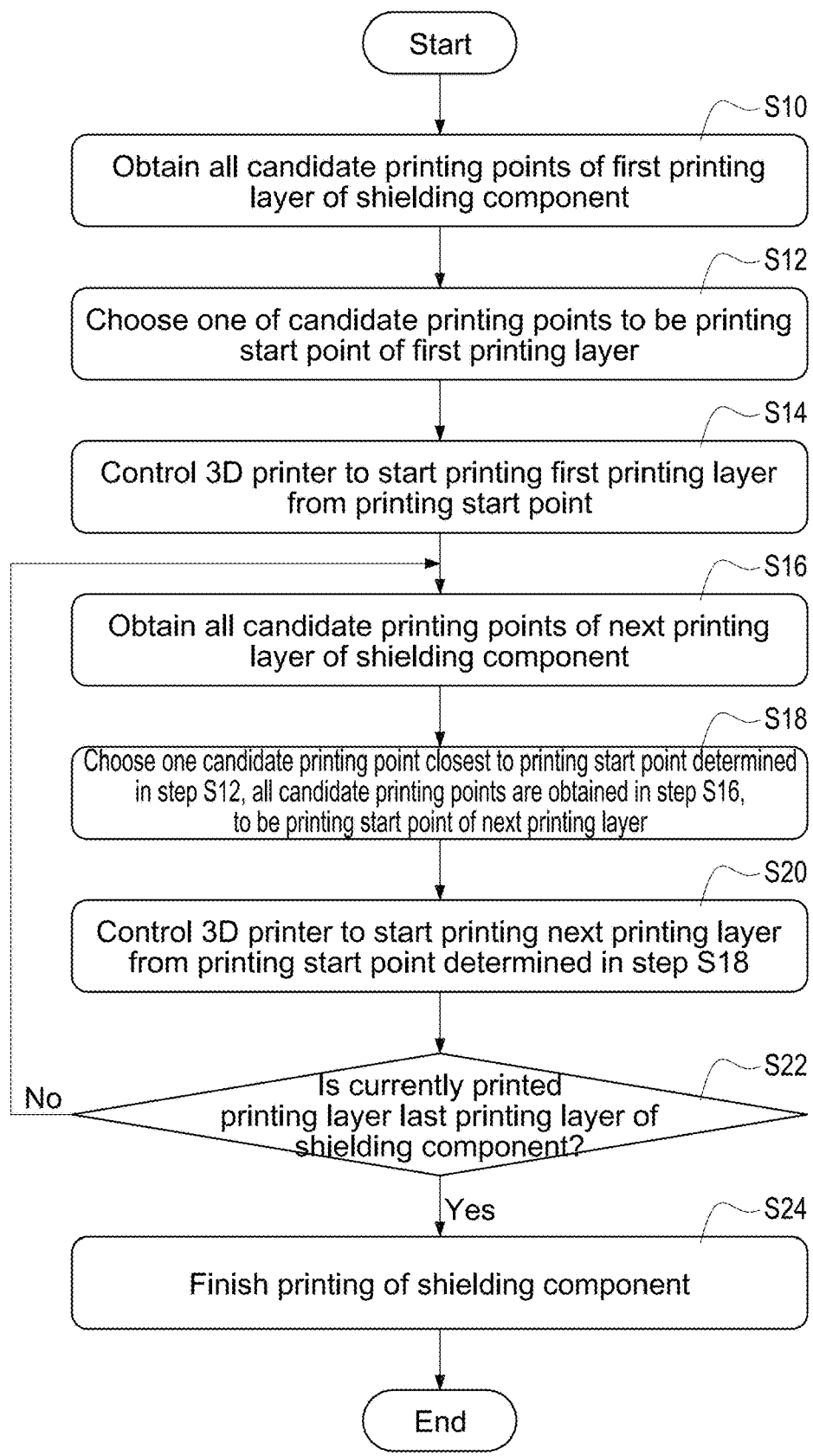
FIG. 1 shows a flowchart of printing according to a first exemplary embodiment of the present disclosure.

Please refer to FIG. 1 first, FIG. 1 shows a flowchart of printing according to a first exemplary embodiment of the present disclosure. While a shielding component of a 3D model (such as the shielding component 10 shown in FIG. 2) is printed, the printing method first obtains all candidate printing points of the first printing layer of the shielding component 10 (step S10).

Figure 2:
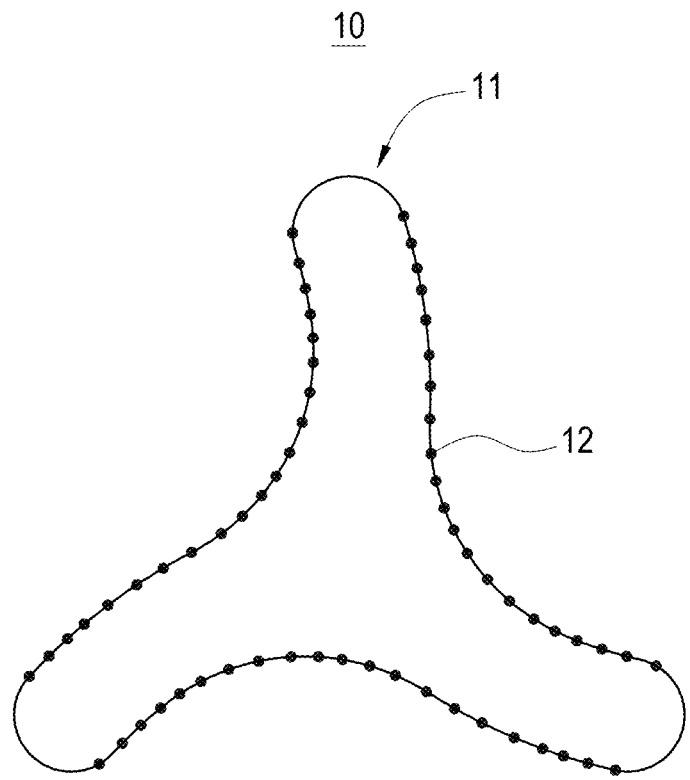
FIG. 2 shows a diagram of concave point according to a first exemplary embodiment of the present disclosure.

Please also refer to FIG. 2, FIG. 2 shows a diagram of concave point according to a first exemplary embodiment of the present disclosure. The shielding component 10 is formed by stacking multiple printing layers 11, and a number of the printing layers 11 is the same as that of the printing layers of the 3D model. In the exemplary embodiment, the first printing layer is meant to be the printing layer of the 3D printer directly formed on a printing platform (not shown).

Return to FIG. 1, the printing method obtains the entire candidate printing points of the first printing layer, then chooses one of the candidate printing points to be a printing start point of the first printing layer (step S12). After the printing start point is chosen, the printing method controls the 3D printer to start printing the first printing layer of the shielding component from the printing start point (step S14).

As shown in FIG. 2, in the exemplary embodiment, the printing method mainly uses all concave points 12 of the first printing layer to be the candidate printing points of the first printing layer, and then chooses one of the concave points 12 to be the aforementioned printing start point. In an exemplary embodiment, all points on surface of the concave curve of the shielding component 10 can be the aforementioned concave point 12.

Each printing layer of the shielding component 10 is more obvious at printing start position, thus reducing the aesthetics of the shielding component 10. Therefore, the exemplary embodiment chooses one of the concave points 12 of the first printing layer to be the printing start point, making the printing start point likely to be located at a concave position of the shielding component 10 and making the printing start point less obvious, thus improving the aesthetics of the shielding component 10 influenced by the printing start points.

In an exemplary embodiment, it needs to be noted that the printing method randomly chooses one of all the candidate printing points of the first printing layer, to be the printing start point of the first printing layer. In another exemplary embodiment, the printing method also can choose a candidate printing point closest to a right upper corner of the first printing layer, from all the candidate printing point of the first printing layer, to be the printing start point of the first printing layer. In another exemplary embodiment, the printing method can build a choosing rule in advance, and send coordinates of all the candidate printing points of the first printing layer to the choosing rule, then the printing method chooses, according to the choosing rule, one candidate printing point to be the printing start points of the first printing layer (for example, the one having the largest fifth number behind the decimal point of the coordinates is to be the printing start point).

Return to FIG. 1, after step S14, the printing method then obtains all candidate printing points of next printing layer of the shielding component 10 (step S16). Specifically, if the nth layer of the shielding component 10 is referred in step 10, then the (n+1)th layer of the shielding component 10 is referred in step S16, that is, the printing layer directly stacked on the nth layer.

Next, the printing method chooses one candidate printing point closest to the printing start point determined in step S12, all candidate printing points are obtained in step S16, to be a printing start point of the next printing layer (step S18). Next, the printing method controls the 3D printer to start printing the next printing layer from the printing start point determined in step S18 (step S20).

In an exemplary embodiment, the printing method mainly uses all concave and non-suspending points of the next printing layer of the shielding component 10 to be the candidate printing points of the next printing layer. Specifically, the suspending point (that is, there is no printed and formed material below) used to be printing start point likely results in failed printing, thus the printing method excludes the concave but suspending points out of the candidates of the printing start point, for avoiding failed printing.

In another exemplary embodiment, the printing method may not take into account of the aforementioned issue of suspending, and could directly use all the concave points 12 of the next printing layer to be the candidate printing points of the next printing layer. In the exemplary embodiment, the printing method determines if the printing start point determined in step S18 is the suspending point before printing. If the printing start point is a suspending point, the printing method controls the 3D printer to print a support material of the shielding component 10 (not shown) below the printing start point. In this way, the support material generated makes the printing start point be not the suspending point, and thus avoiding the failed printing.

Return to FIG. 1, after the printing of the next printing layer is finished, the printing method determines if the currently printed printing layer is a last printing layer of the shielding component 10 (step S22). If the currently printed printing layer is not the last printing layer of the shielding component 10, the printing method executes step S16 to step S20 again, to calculate the printing start points of the rest of printing layers of the shielding component 10 sequentially, and according to printing action performed to the printing layers (for example, (n+2)th layer, (n+3)th layer and so on).

If the currently printed printing layer is the last printing layer of the shielding component 10, then the printing method finishes printing of the shielding component 10 (step S24).

Figure 9:
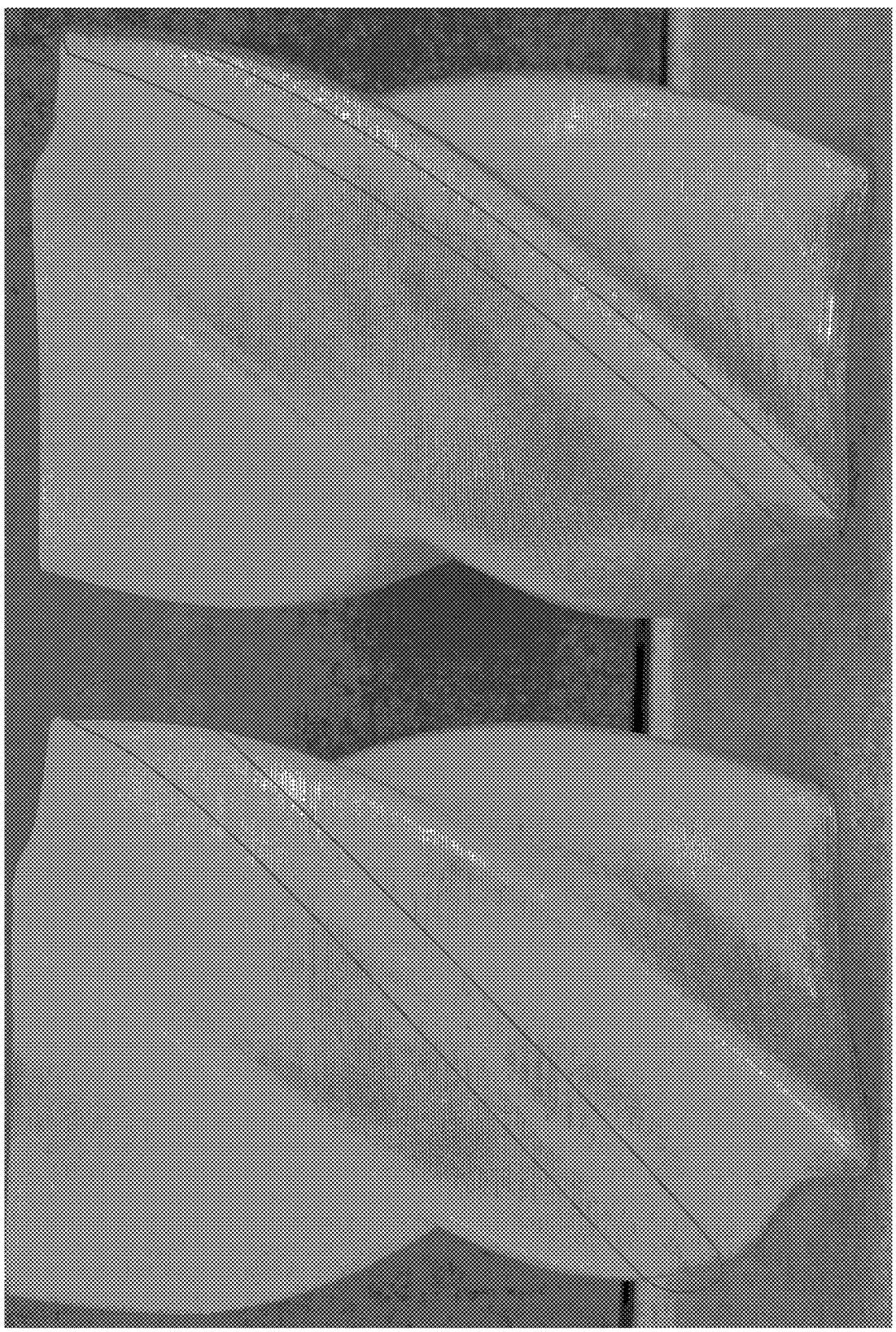
FIG. 9 shows a diagram of an entity of shielding component according to a first exemplary embodiment of the present disclosure.

In the exemplary embodiment, the 3D printer printing the shielding component 10 chooses a point closest to the printing start point of the last printing layer, in each printing layer respectively, to be the printing start point of each printing layer, thus the printing start points of the printing layers are closer to each other, and improve the aesthetics of the printed shielding component 10. The shielding component 10 already printed in each exemplary embodiment of the present disclosure can be referred in FIG. 9, FIG. 9 shows a diagram of an entity of shielding component according to a first exemplary embodiment of the present disclosure. As shown in FIG. 9, a 3D model printed according to the related art is in the left half of the diagram, with multiple printing start points more rough and discontinuous on the shielding thereof. A 3D model printed according to each exemplary embodiment of the present disclosure is in the right half of the diagram, with multiple printing start points more smooth and continuous on the shielding thereof.

In the exemplary embodiment shown in FIG. 2, each of the printing layers 11 on the shielding component 10 is only printed once (that is, each of the printing layers 11 only includes a printing loop). In other exemplary embodiments, if thickness of the shielding component 10 needs to be increased, the 3D printer can perform printing to each of the printing layers 11 on the shielding component 10 twice or more (that is, each of the printing layers 11 includes multiple printing loops).

Figure 3:
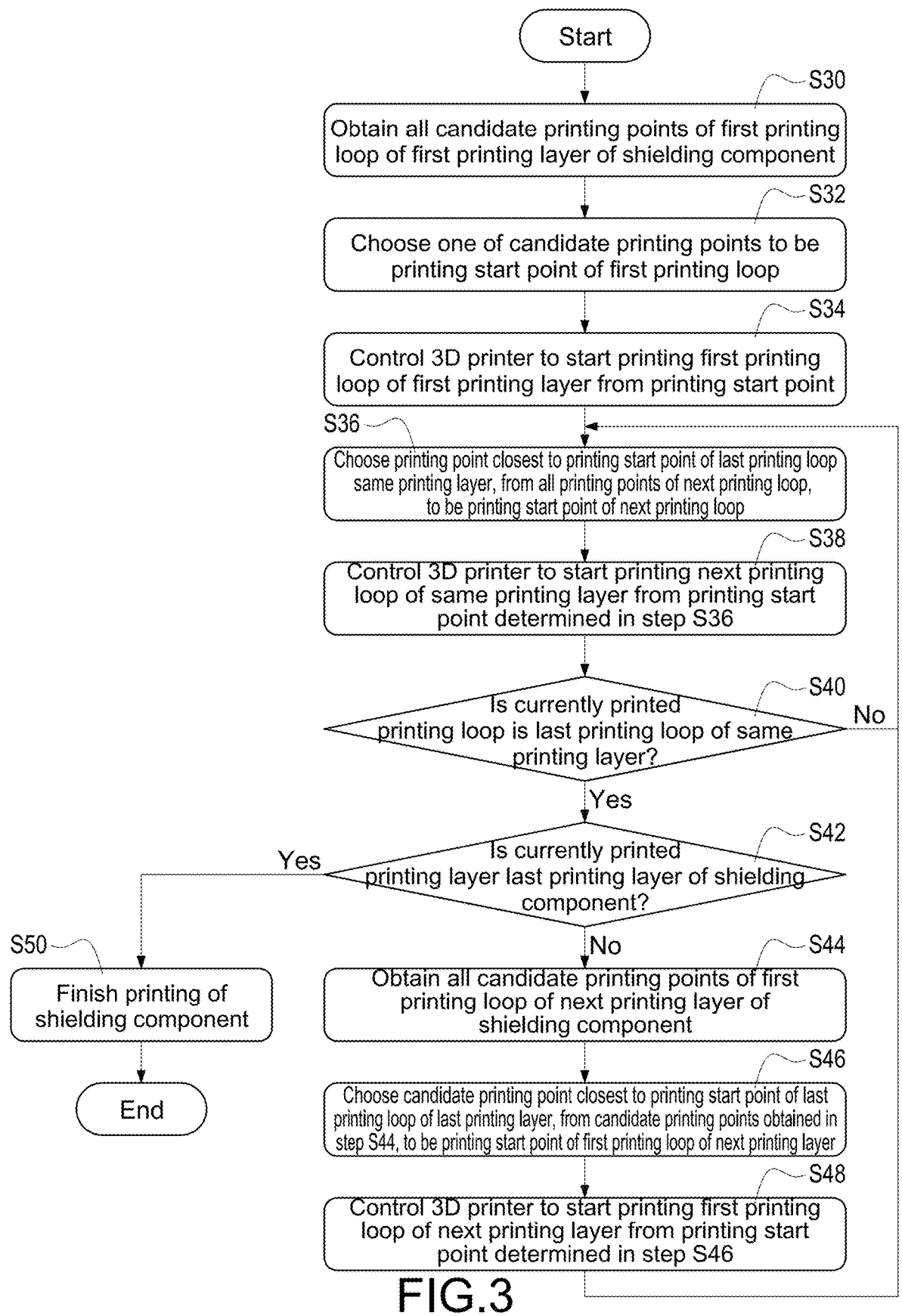
FIG. 3 shows a flowchart of printing according to a second exemplary embodiment of the present disclosure.

Then please refer to FIG. 3, FIG. 3 shows a flowchart of printing according to a second exemplary embodiment of the present disclosure. The exemplary embodiment shown in FIG. 3 mainly prints a shielding component with printing layers having at least printing loops respectively.

In the exemplary embodiment, the printing method first obtains all candidate printing points of the first printing loop of the first printing layer of the shielding component (step S30), and chooses one of the candidate printing points to be a printing start point of the first printing loop (step S32). In the exemplary embodiment, the method for determining the candidate printing points and the printing start points is similar to or the same as that shown in FIG. 1, detailed description is not repeated here. After step S32, the printing method controls the 3D printer to start printing the first printing loop of the first printing layer from the printing start point determined in step S32 (step S34).

Next, the printing method ensures a printing start point of next printing loop (the second printing loop here) of the same printing layer (the first printing layer here). Specifically, the next printing loop has a plurality of printing points, in the exemplary embodiment, the printing method chooses a printing point closest to the printing start point of the last printing loop (the first printing loop here) of the same printing layer, from all printing points of the next printing loop, to be the printing start point of the next printing loop (step S36). Next, the printing method controls the 3D printer to start printing the next printing loop of the same printing layer (step S38) from the printing start point determined in step S36.

After step S38, the printing method determines if the currently printed printing loop is the last printing loop of the same printing layer (the first printing layer here)(step S40). If the currently printed printing loop is not the last printing loop, then the printing method executes step S36 to step S38 again, to calculate the printing start point of the rest of the printing loops (for example, the third printing loop, the fourth printing loop etc.) of the same printing layer, and thus performing printing to the printing loops.

If the currently printed printing loop is the last printing loop of the same printing layer, the current printing layer (the first printing layer here) is already printed.

Next, the printing method further determines if the current printing layer is the last printing layer of the shielding component (step S42). If the current printing layer is not the last printing layer of the shielding component, then the printing method further obtains all candidate printing points of the first printing loop of the next printing layer (the second printing layer here) of the shielding component (step S44), and chooses a candidate printing point closest to the printing start point of the last printing loop of the last printing layer, from the candidate printing points obtained in step S44, to be a printing start point of the first printing loop of the next printing layer (step S46). In the exemplary embodiment, the method for determining the candidate printing points and the printing start points is similar to or the same as that shown in FIG. 1, detailed description is not repeated here.

For example, if each of the printing layers of the shielding component has a first printing loop and a second printing loop, then the printing start point A2 of the second printing loop of the first printing layer is the point closest to a printing start point A1 of the first printing loop of the first printing layer, in all printing points of the second printing loop. A printing start point B1 of the first printing loop of the second printing layer is the point closest to a printing start point A2 of the second printing loop of the first printing layer, in all printing points of the first printing loop. A printing start point B2 of the second printing loop of the second printing layer is the point closest to a printing start point B1 of the first printing loop of the second printing layer, in all printing points of the second printing loop, and so on.

After step S46, the printing method controls the 3D printer to start printing the first printing loop of the next printing layer from the printing start point determined in step S46 (step S48). After step S48, the printing method executes step S36 to step S40 again, to calculate the printing start points of the rest of the printing loops of the same printing layer, and thus to perform printing to the printing loops.

If it is determined that the current printing layer is the last printing layer of the shielding component in step S42, then the printing method finishes printing to the shielding component 10 (step S50).

If each of the printing layers of the shielding component has at least two printing loops, then in an exemplary embodiment, the first printing loop of each printing layer is an inner loop of the shielding component, and the last printing loop of each printing layer is an outer loop of the shielding component.

Specifically, an electric device can perform slicing to triangular surface data of an original 3D drawing document of the 3D model, in order to obtain printing route data of the inner loop and the outer loop of multiple printing layers of the 3D model. The slicing process is executed while the electric device also defines, according to a normal vector of the triangular surface data of the original 3D drawing document, inward, outward direction corresponding to the inner loop and the outer loop (the normal vector of triangular surface is generally meant to be an outward direction, thus an opposite direction of the normal vector of triangular surface can be defined to be an inward direction).

Next, the slicing process is executed while the electric device calculates the printing route data of the outer loop first, then copies the printing route data of the outer loop and narrows the outer loop inwardly by a line-width and, to obtain the printing route data of the inner loop of the same printing layer. If the number of the printing loops of the printing layer does not match the requirement, the electric device then copies the printing route data of the printing loop most inward currently, and narrows the printing loop toward the inward direction defined above by a line-width, to obtain the printing route data of the updated inner loop. If the number of the printing loops of the printing layer has matched the requirement, the rest of inner space of the printing layer is filled, and calculating of the printing layer is finished.

As stated above, in the present disclosure, the inner loop is the printing loop toward inner part of the shielding component along the inward direction defined above, and the outer loop is the printing loop toward outer part of the shielding component along the outward direction defined above. In another exemplary embodiment, the inner loop is a printing loop closer to an object entity direction in the shielding component, and the outer loop is the printing loop closer to an open space in the shielding component. In still another exemplary embodiment, the inner loop is a printing loop closer to a direction opposite to the normal vector of triangular surface of the original 3D drawing document of the 3D model, and the outer loop is a printing loop closer to a direction along the normal vector of triangular surface of the original 3D drawing document of the 3D model.

In other words, the aforementioned outer loop can be seen by the user through the eyes after the printing of the shielding component is finished, while the aforementioned inner loop cannot be seen by the user through the eyes. Moreover, the outer loop can largely influence the appearance of the printed the shielding component, thus in an exemplary embodiment, the printing method printing each printing layer of the shielding component prints the inner loop first, then prints the outer loop. The aforementioned examples are only various embodiments of the present disclosure, but not limitation.

Figure 4A:
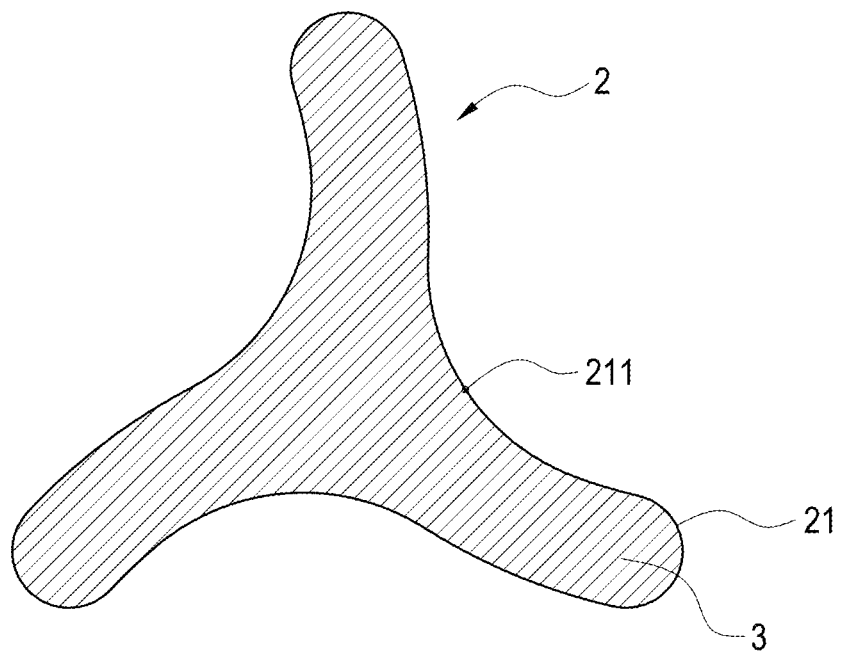
FIG. 4A shows a diagram of shielding component according to a first exemplary embodiment of the present disclosure.
Figure 4B:
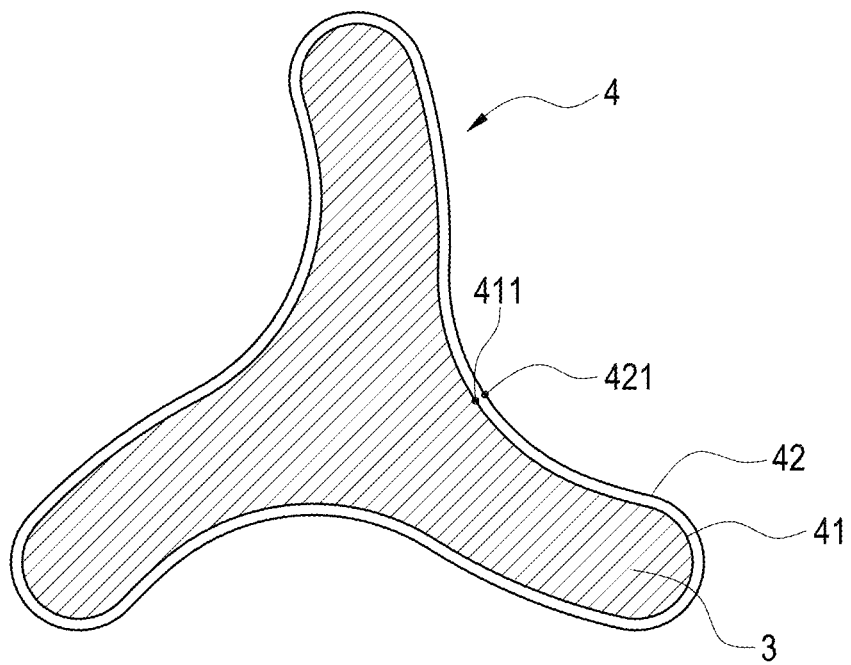
FIG. 4B shows a diagram of shielding component according to a second exemplary embodiment of the present disclosure.
Figure 4C:
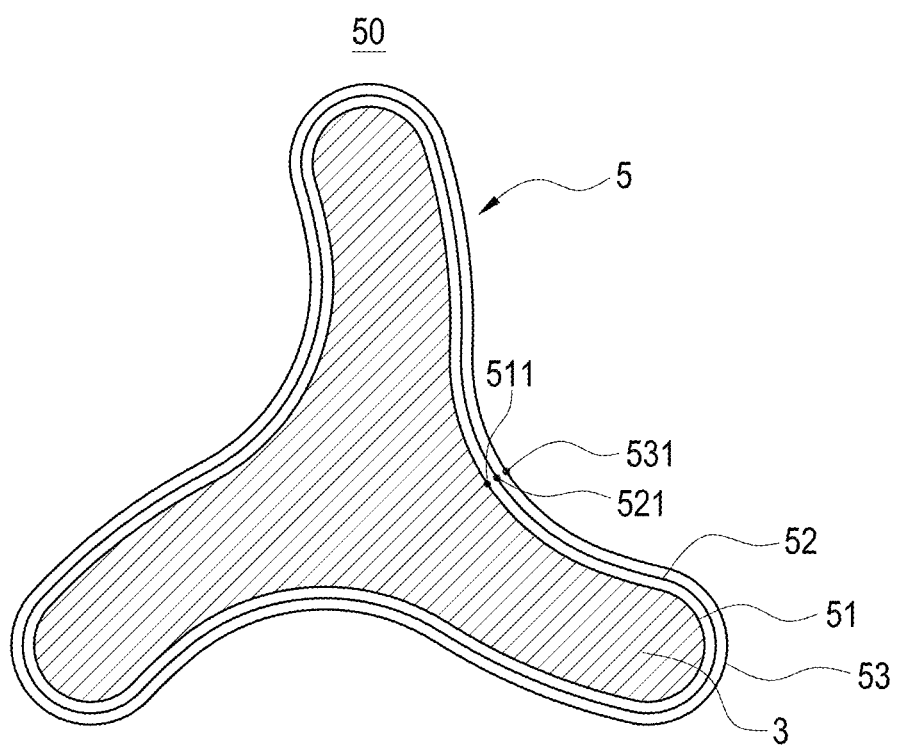
FIG. 4C shows a diagram of shielding component according to a third exemplary embodiment of the present disclosure.

Please also refer to FIG. 4A, FIG. 4B and FIG. 4C, respectively shows a diagram of shielding component according to a first, second, and third exemplary embodiment of the present disclosure.

FIG. 4A discloses a 3D model 20 of a first type, the 3D model 20 includes a shielding component 2, and each printing layer of the shielding component 2 includes a single printing loop 21. Inner part of the shielding component 2 is filled with filling material 3 to make the inner part solid, and the printing loop 21 is printed from a printing start point 211 at a concave position. The example in FIG. 4A is a single printing layer, if the second printing layer of the shielding component 2 (not shown) is to be printed, then a printing start point of the printing loop of the second printing layer, is a candidate printing point closest to the printing start point 211 of the last printing loop 21, in all candidate printing points of the printing loop.

FIG. 4B discloses a 3D model 40 of a second type, the 3D model 40 includes a shielding component 4, each printing layer of the shielding component 4 respectively includes a first printing loop 41 and a second printing loop 42, and the inner part of the shielding component 4 is filled with the filling material 3 to make the inner part solid.

In the exemplary embodiment, the first printing loop 41 is closer to the filling material 3 (that is, the aforementioned object entity direction), thus is considered as the aforementioned inner loop. The second printing loop 42 is closer to the outer space (that is, the aforementioned open space direction), thus is considered as the aforementioned outer loop. During the printing process, the printing of the first printing loop 41 is started from a printing start point 411 at a concave position, while the printing of the second printing loop 42 is started from a printing start point 421 at a concave position, and the printing start point 421 is a concave point closest to the printing start point 411, in all printing points of the second printing loop 42. The example in FIG. 4B is a single printing layer, the printing method for other printing layers of the shielding component 4 is similar to or the same as description in FIG. 4A, detailed description is not repeated here.

FIG. 4C discloses a 3D model 50 of a third type, the 3D model 50 includes a shielding component 5, each printing layer of the shielding component 5 respectively includes a first printing loop 51, a second printing loop 52 and a third printing loop 53, and the shielding component 5 is filled with the filling material 3 to be solid. During the printing process, the printing of the first printing loop 51 is started from a printing start point 511 at a concave position, while the printing of the second printing loop 52 is started from a printing start point 521 at a concave position, and the printing of the third printing loop 53 is started from a printing start point 531 at a concave position. In the exemplary embodiment, the printing start point 521 is a concave point closest to the printing start point 511, in all printing points of the second printing loop 52, and the printing start point 531 is a concave point closest to the printing start point 521, in all printing points of the third printing loop 53.

The example in FIG. 4C is a single printing layer, the printing method for other printing layers of the shielding component 50 is similar to or the same as description in FIG. 4A, detailed description is not repeated here.

Figure 5:
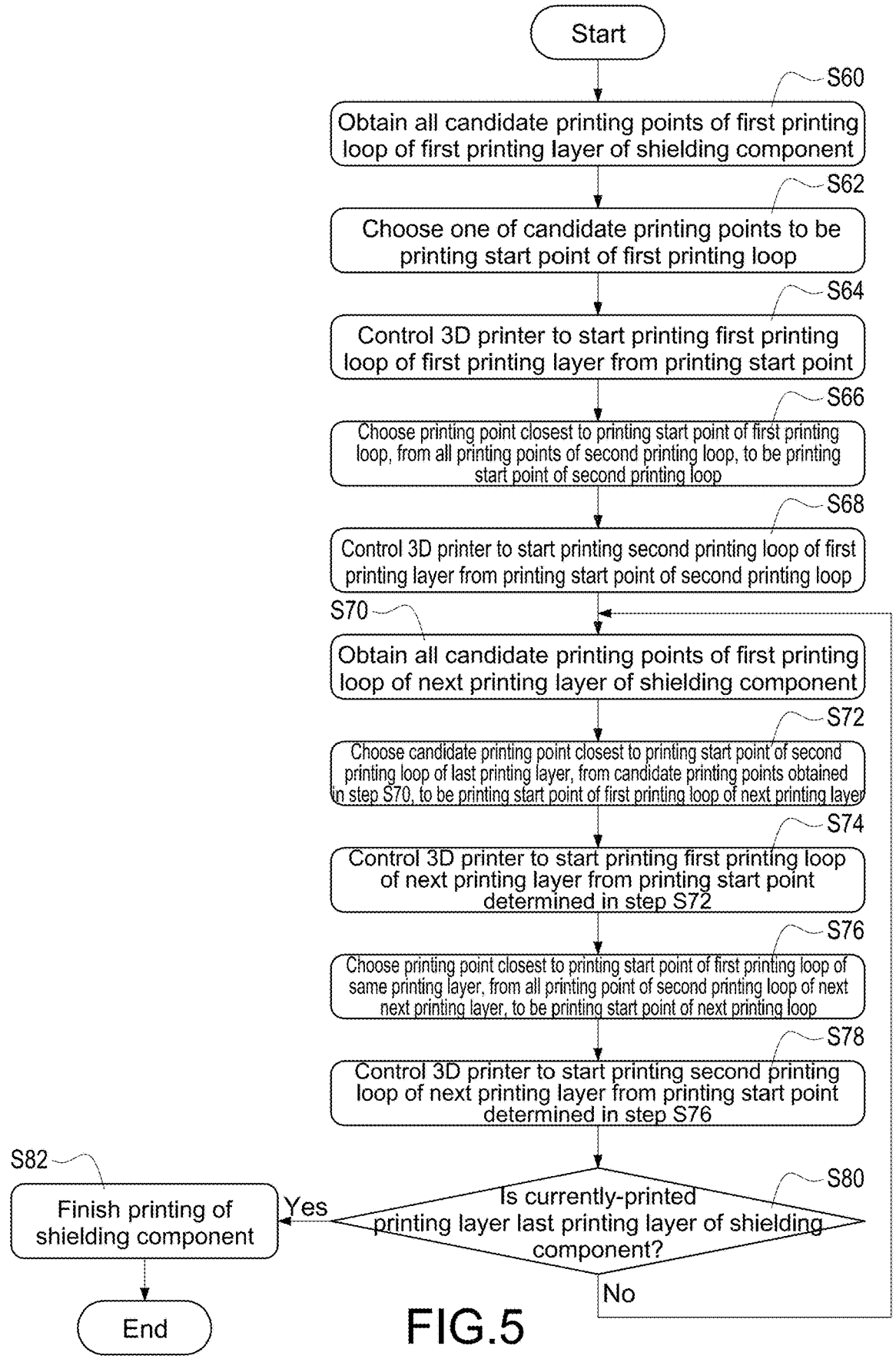
FIG. 5 shows a flowchart of printing according to a third exemplary embodiment of the present disclosure.

Then please refer to FIG. 5, FIG. 5 shows a flowchart of printing according to a third exemplary embodiment of the present disclosure. The exemplary embodiment in FIG. 5 mainly prints the shielding component (that is, as the shielding component 4 shown in FIG. 4B) with each printing layer including two printing loops (considered as the inner loop and the outer loop).

First, the printing method obtains all candidate printing points of the first printing loop 41 of the first printing layer of the shielding component 4 (step S60) first, and chooses one of the candidate printing points to be the printing start point 411 of the first printing loop 41 (step S62). In the exemplary embodiment, the method for determining the candidate printing points and the printing start point 411 is similar or the same as that shown in FIG. 1, detailed description is not repeated here. After step S62, the printing method controls the 3D printer to start printing the first printing loop 41 of the first printing layer from the printing start point 411 (step S64).

Next, the printing method ensures the printing start point 421 of the second printing loop 42 of the same printing layer. In the exemplary embodiment, the printing method chooses the printing point closest to the printing start point 411 of the first printing loop 41, in all printing points of the second printing loop 42, to be the printing start point 421 of the second printing loop 42 (step S66). Next, the printing method controls the 3D printer to start printing the second printing loop 42 from the printing start point 421 (step S68).

After step S68, the printing method further obtains all candidate printing points of the first printing loop of the next printing layer of the shielding component 4 (step S70), and chooses a candidate printing point closest to the printing start point 421 of the second printing loop 42 of the first printing layer, from the candidate printing points, to be the printing start point of the first printing loop of the next printing layer (step S72). In the exemplary embodiment, the method for determining the candidate printing points and the printing start point 411 is similar to or the same as that shown in FIG. 1, detailed description is not repeated here.

After step S72, the printing method controls the 3D printer to start printing the first printing loop of the next printing layer from the printing start point determined in step S72 (step S74).

After step S74, the printing method ensures the printing start point of the second printing loop of the next printing layer. In the exemplary embodiment, the printing method chooses the printing point closest to the printing start point of the first printing loop of the same printing layer, from all printing point of the second printing loop of the next printing layer, to be the printing start point of the second printing loop of the next printing layer (step S76). Next, the printing method controls the 3D printer to start printing the second printing loop of the next printing layer from the printing start point determined in step S76 (step S78).

After step S78, the printing method determines if the currently-printed (currently-processed) printing layer (the exemplary embodiment means the second printing layer) is a last printing layer of the shielding component 4 (step S80). If the currently-printed printing layer is not the last printing layer of the shielding component 4, the printing method executes step S70 to step S80 again, to sequentially calculates the first printing loop 41 and the second printing loop 42 of the rest of the printing layers of the shielding component 4, and thus prints the printing layers. If the currently-printed printing layer is the last printing layer of the shielding component 4, then the printing method finishes the printing of the shielding component 4 (step S82).

In the aforementioned exemplary embodiment, the 3D model mainly includes a single shielding component, however, as mentioned above, a 3D model may include multiple shielding components for different shapes or structures.

Figure 6A:
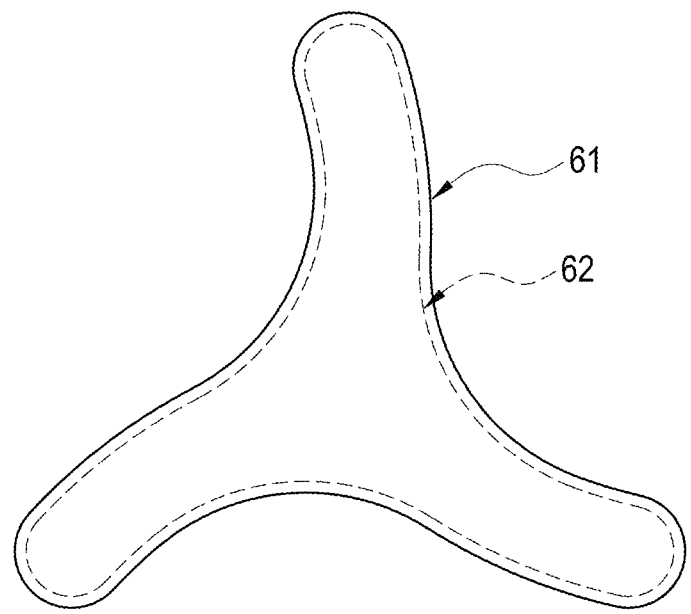
FIG. 6A shows a diagram of 3D model according to a first exemplary embodiment of the present disclosure.
Figure 6B:
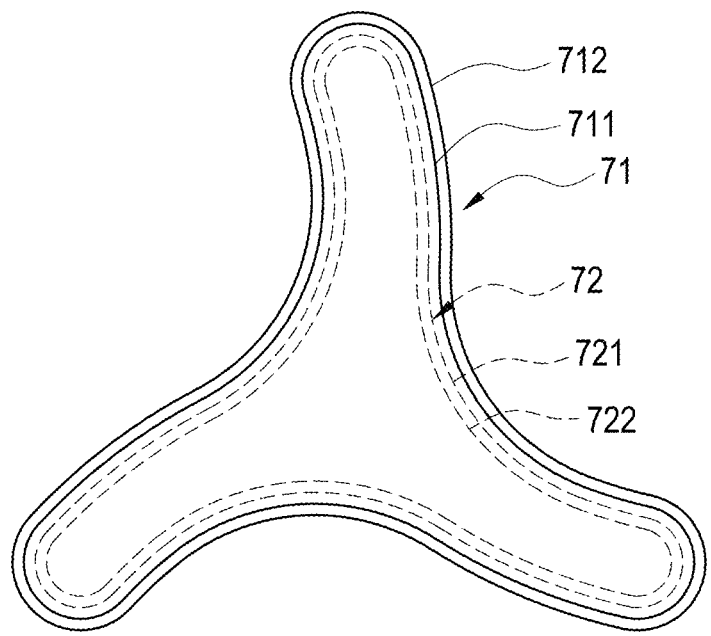
FIG. 6B shows a diagram of 3D model according to a second exemplary embodiment of the present disclosure.

Please also refer to FIG. 6A and FIG. 6B, FIG. 6A shows a diagram of 3D model according to a first exemplary embodiment of the present disclosure, FIG. 6B shows a diagram of 3D model according to a second exemplary embodiment of the present disclosure. FIG. 6A discloses a hollow 3D model 60, the 3D model 60 includes a first shielding component 61 toward an open space and a second shielding component 62 toward an inner space. The first shielding component 61 only includes a single printing loop, and the second shielding component 62 only includes a single printing loop.

In an exemplary embodiment, the 3D printer mainly executes the process shown in FIG. 1 to perform printing to the first shielding component 61, and executes the same process to perform printing to the second shielding component 62 again. Specifically, the 3D printer executes the printing method once to only print a single shielding component, in the exemplary embodiment, the 3D model 60 includes two shielding components 61, 62, thus the 3D printer has to execute the printing method two times for printing the two shielding components 61, 62 sequentially or simultaneously, so as to print the entire 3D model 60.

FIG. 6B discloses another hollow 3D model 70, the 3D model 70 includes a first shielding component 71 toward an open space and a second shielding component 72 toward an inner space. The first shielding component 71 is formed by a first printing loop 711 and a second printing loop 712, the second shielding component 72 is formed by a first printing loop 721 and a second printing loop 722.

In an exemplary embodiment, the 3D printer mainly executes the process shown in FIG. 3 or FIG. 5 to perform the printing to the first shielding component 71, and executes the same process to perform the printing to the second shielding component 72 again. In this way, the printing method is executed many times to print the entire 3D model 70.

In aforementioned exemplary embodiment, the 3D printer executes the printing method in real time during the printing process, to start printing each printing loop according to the determined printing start point, after determining the printing start point of each printing loop. In other exemplary embodiments, the 3D printer also can execute the printing method in advance before actually printing, to start printing after determining the printing start points of all printing loops of a shielding component. Accordingly, the present disclosure further discloses a method for calculating a printing start point of the shielding component.

Figure 7:
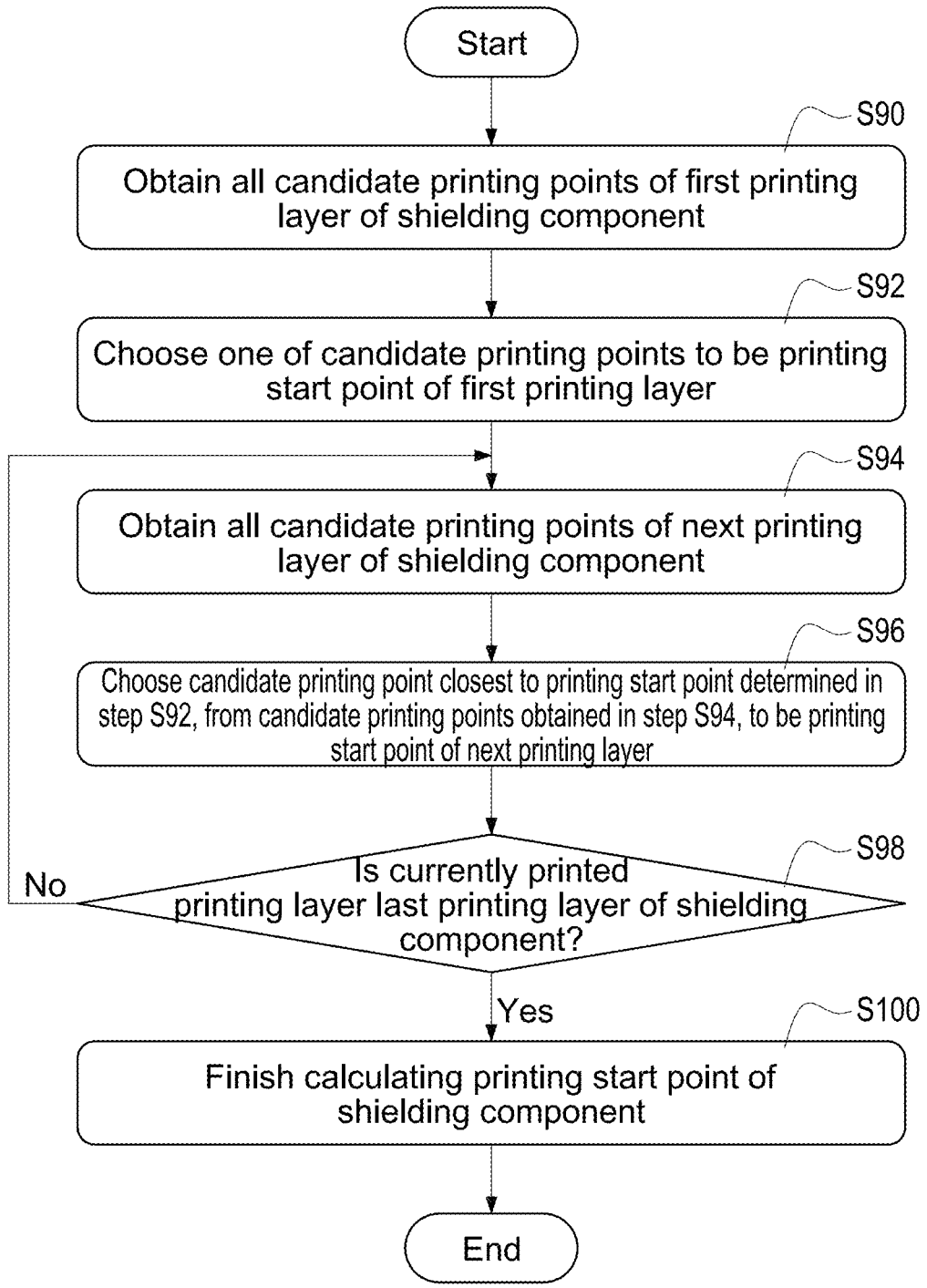
FIG. 7 shows a flowchart of calculating according to a first exemplary embodiment of the present disclosure.

Refer to FIG. 7, FIG. 7 shows a flowchart of calculating according to a first exemplary embodiment of the present disclosure. In the exemplary embodiment, the 3D printer printing a shielding component obtains all candidate printing points of the first printing layer of the shielding component first (step S90), then chooses one of the candidate printing points, to be a printing start point of the first printing layer (step S92). After step S92, the prints 3D printer obtains all candidate printing points of the next printing layer of the shielding component (step S94), and chooses a candidate printing point closest to the printing start point determined in step S92, from the candidate printing points obtained in step S94, to be a printing start point of the next printing layer (step S96).

In the exemplary embodiment shown in FIG. 7, each printing layer of the shielding component only includes a single printing loop, thus omitting further description here.

In an exemplary embodiment, the 3D printer mainly uses all concave points of the first printing layer to be the candidate printing points of the first printing layer.

In an exemplary embodiment, the 3D printer randomly chooses one of all candidate printing points of the first printing layer to be the printing start point of the first printing layer, or chooses a candidate printing point closest to a right upper corner of the first printing layer to be the printing start point of the first printing layer.

In an exemplary embodiment, the 3D printer uses all concave and non-suspending points of the next printing layer to be the candidate printing point of the next printing layer.

In an exemplary embodiment, the 3D printer uses all concave points of the next printing layer to be the candidate printing points of the next printing layer. It is determined that if the printing start point of the next printing layer is a suspending point, if the printing start point of the next printing layer is a suspending point, then printing data of a support material of the shielding component is generated below the printing start point of the next printing layer. In this way, failed printing of the next printing layer of the aforementioned shielding component can be avoided, by printing of the support material during actual printing.

Specifically, the aforementioned method for determining the candidate printing points and printing start point is similar to or the same as that shown in FIG. 1, detailed description is not repeated here.

After step S96, the 3D printer determines if the printing layer processed currently is the last printing layer of the shielding component (step S98). If the printing layer processed currently is not the last printing layer of the shielding component, the 3D printer executes step S94 to step S96 again, to calculate the printing start point of the next printing layer of the shielding component. If the printing layer processed currently is the last printing layer of the shielding component, then the 3D printer finishes calculating the printing start point of the shielding component (step S100).

In the aforementioned exemplary embodiment, the example mainly is the shielding component with each printing layer only including a single printing loop. However, the method for calculating the printing start point of the shielding component of the present disclosure also can be adopted to a shielding component with each printing layer including multiple printing loops.

Figure 8:
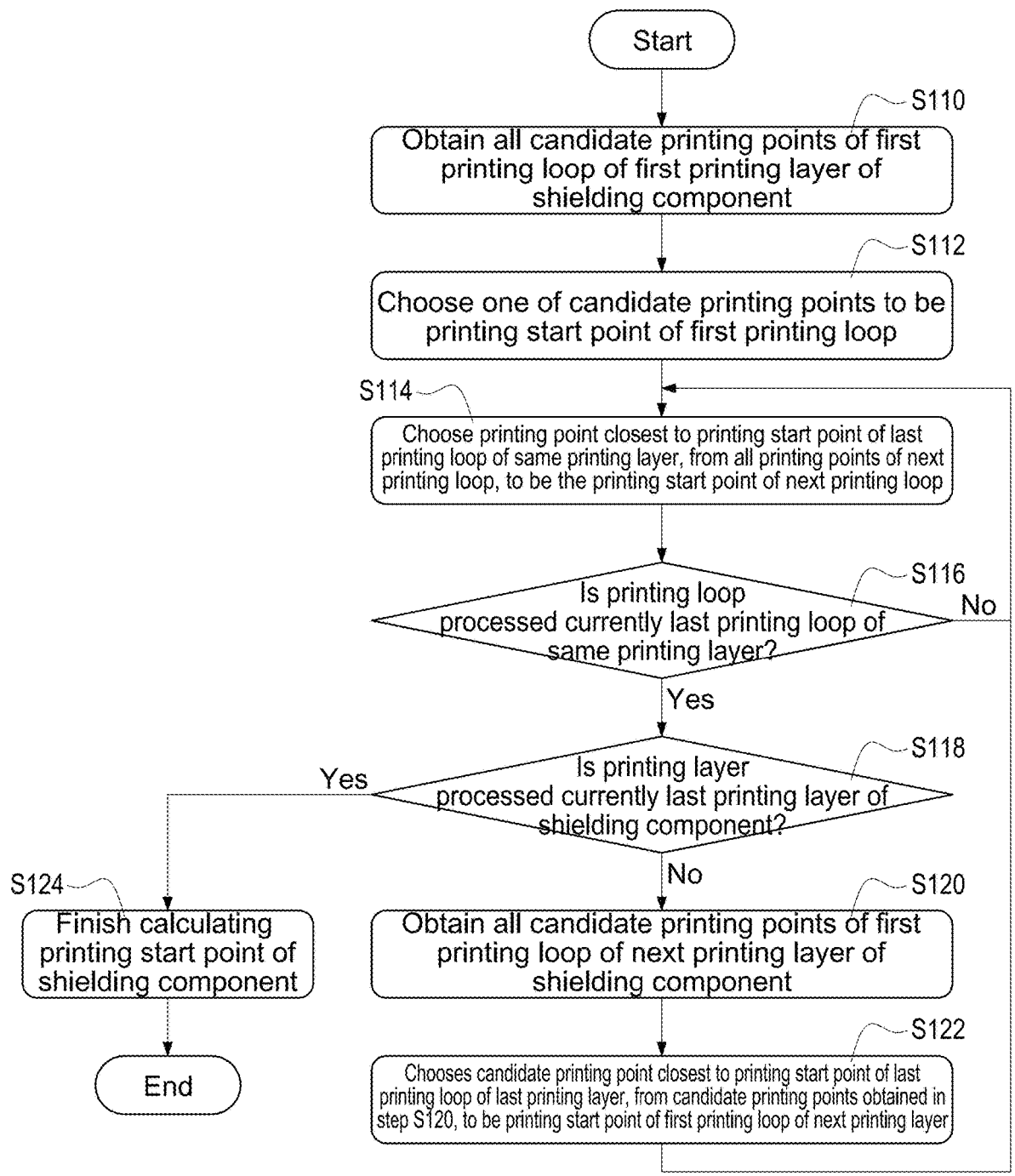
FIG. 8 shows a flowchart of calculating according to a second exemplary embodiment of the present disclosure.

Refer to FIG. 8, FIG. 8 shows a flowchart of calculating according to a second exemplary embodiment of the present disclosure. In the exemplary embodiment, the 3D printer obtains all candidate printing points of the first printing loop of the first printing layer of the shielding component (step S110), and chooses one of the candidate printing points of the first printing loop to be a printing start point of the first printing loop (step S112). In the exemplary embodiment, the method for determining the candidate printing points and the printing start points is similar to or the same as that shown in FIG. 1, detailed description is not repeated here.

Next, the 3D printer ensures a printing start point of the next printing loop of the same printing layer (the second printing loop here). Specifically, the 3D printer chooses the printing point closest to the printing start point of the last printing loop (the first printing loop here) of the same printing layer, from all printing points of the next printing loop, to be the printing start point of the next printing loop (step S114).

After step S114, the 3D printer determines if the printing loop processed currently is the last printing loop of the same printing layer (step S116). If the printing loop processed currently is not the last printing loop, then the 3D printer executes step S114 again, to determine the printing start points of the rest of the printing loops of the same printing layer.

If the printing loop processed currently is the last printing loop of the same printing layer, it means that the printing start points of all printing loops of the printing layer processed currently are all determined. Next, the 3D printer further determines if the printing layer processed currently is the last printing layer of the shielding component (step S118).

If the printing layer processed currently is not the last printing layer of the shielding component, then the 3D printer further obtains all candidate printing points of the first printing loop of the next printing layer of the shielding component (step S120), and chooses a candidate printing point closest to the printing start point of the last printing loop of the last printing layer, from the candidate printing points obtained in step S120, to be a printing start point of the first printing loop of the next printing layer (namely, using the closest candidate printing point, to be the printing start point of the first printing loop of the next printing layer) (step S122). In the exemplary embodiment, the method for determining the candidate printing points and the printing start points is similar to or the same as that shown in FIG. 1, detailed description is not repeated here.

After step S122, the 3D printer executes step S114 to step S116 again, to determine the printing start points of the rest of the printing loops of the same printing layer.

If it is determined that the printing layer processed currently is the last printing layer of the shielding component in step S118, then the 3D printer finishes calculating the printing start point of the shielding component 10 (step S124).

Refer to FIG. 9, it can be seen that the printing start points of the printing loops of each printing layer of the shielding component is determined by each exemplary embodiment of the present disclosure, and the printing is performed to the shielding component according to the printing start points, resulting in the printing start points on the shielding component more continuous, thus aesthetics of the printed shielding component is largely improved (refer to the 3D model on right half of FIG. 9).

Thus, particular embodiments have been described. Other embodiments are within the scope of the following claims. For example, the actions recited in the claims may be performed in a different order and still achieve desirable results.

What is claimed is:

1. A printing method for shielding component of 3D model, used for a 3D printer printing a shielding component (2) of a 3D model (20), the method comprising:
   a) obtaining all candidate printing points of a first printing layer (11) of the shielding component (2), wherein all concave points (12) of the first printing layer (11) are used as the candidate printing points of the first printing layer (11);
   b) choosing one of the candidate printing points obtained in step a) to be a printing start point (211) of the first printing layer (11);
   c) controlling the 3D printer to start printing the first printing layer (11) from the printing start point (211) determined in step b);
   d) obtaining all candidate printing points of a next printing layer (11) of the shielding component (2), wherein all concave but suspending points of the next printing layer (11) are excluded from the candidate printing points of the next printing layer (11), and all concave and non-suspending points of the next printing layer (11) are used as the candidate printing points of the next printing layer (11);
   e) choosing a candidate printing point closest to the printing start point (211) determined in step b) from the candidate printing points obtained in step d), and using the candidate printing point closest to the printing start point (211) as a printing start point (211) of the next printing layer (11);
   f) controlling the 3D printer to start printing the next printing layer (11) from the printing start point (211) determined in step e);
   g) executing step d) to step f) again if the printing layer (11) currently printed is not a last printing layer (11) of the shielding component (2); and
   h) completing printing the shielding component (2) when the printing layer (11) currently printed is the last printing layer (11) of the shielding component (2).

2. The printing method for shielding component of 3D model of claim 1, wherein step b) randomly chooses one of all the candidate printing points of the first printing layer (11) to be the printing start point (211) of the first printing layer (11), or choosing a candidate printing point closest to a right upper corner of the first printing layer (11) to be the printing start point (211) of the first printing layer (11).

3. A printing method for shielding component of 3D model, used for a 3D printer printing a shielding component (4) of a 3D model (40), the method comprising:
   a) obtaining all candidate printing points of a first printing loop (41) of a first printing layer (11) of the shielding component (2), wherein all concave points (12) of the first printing loop (41) of the first printing layer (11) are used as the candidate printing points of the first printing loop (41) of the first printing layer;
   b) choosing one of the candidate printing points obtained in the first printing loop (41) to be a printing start point (411) of the first printing loop (41);
   c) controlling the 3D printer to start printing the first printing loop (41) from the printing start point (411) of the first printing loop (41);
   d) ensuring a printing start point (421) of a next printing loop (42) of the printing layer (11), wherein the next printing loop (42) has a plurality of printing points, the printing start point (421) of the next printing loop (42) is a printing point closest to the printing start point (411) of the printing loop (41) last printed of the plurality of printing points;
   f) controlling the 3D printer to start printing the next printing loop (42) from the printing start point (421) determined in step d); and
   g) executing step d) to step f) again when determining that the currently printed printing loop (42) is not a last printing loop of the printing layer (11) being the same;
   h) determining if the printing layer (11) currently printed is a last printing layer (11) of the shielding component (4);
   i) obtaining all candidate printing points of the first printing loop (41) of a next printing layer (11) of the shielding component (4) when the printing layer (11) currently printed is not the last printing layer (11) of the shielding component (4), wherein all concave but suspending points of the first printing loop (41) of the next printing layer (11) are excluded from the candidate printing points of the first printing loop (41) of the next printing layer (11), and all concave and non-suspending points of the first printing loop (41) of the first printing layer (11) are used as the candidate printing points of the first printing loop (41) of the next printing layer (11);
   j) using a candidate printing point closest to the printing start point (421) of the last printing loop (42) of the printing layer (11) last printed, to be a printing start point (411) of the first printing loop (41) of the next printing layer (11), wherein the candidate printing point is one of the candidate printing points obtained in step i);

k) controlling the 3D printer to start printing the first printing loop (41) of the next printing layer (11) from the printing start point (411) determined in step j);

l) executing step d) to step q) again; and m) completing printing the shielding component (4) when the printing layer (11) currently printed is the last printing layer (11) of the shielding component (4).

4. The printing method for shielding component of 3D model of claim 3, wherein the first printing loop (41) of each printing layer (11) is an inner loop of the shielding component (4), the last printing loop (42) of each printing layer (11) is an outer loop of the shielding component (4).

5. The printing method for shielding component of 3D model of claim 4, wherein the inner loop is a printing loop near an object entity direction in the shielding component (4), the outer loop is a printing loop near an open space direction in the shielding component (4).

6. The printing method for shielding component of 3D model of claim 4, wherein the inner loop is a printing loop near a direction opposite to a normal vector of triangular surface in an original 3D drawing document of the 3D model (40), the outer loop is a printing loop near a direction along a normal vector of triangular surface in the original 3D drawing document.

7. The printing method for shielding component of 3D model of claim 3, wherein step b) randomly chooses one of all the candidate printing points of the first printing loop (41) of the first printing layer (11) to be the printing start point (411) of the first printing loop (41) of the first printing layer (11), or chooses a candidate printing point closest to a right upper corner of the first printing layer (11) to be the printing start point (411) of the first printing loop (41) of the first printing layer (11).

8. A calculating method for printing start point of shielding component of 3D model, the method comprising:

a) obtaining all candidate printing points of a first printing layer (11) of the shielding component (2), wherein all concave points (12) of the first printing layer (11) are used as the candidate printing points of the first printing layer (11);

b) choosing one of the candidate printing points obtained in step a) to be a printing start point (211) of the first printing layer (11);

c) obtaining all candidate printing points of a next printing layer (11) of the shielding component (2), wherein all concave but suspending points of the next printing layer (11) are excluded from the candidate printing points of the next printing layer (11), and all concave and non-suspending points of the next printing layer (11) are used as the candidate printing points of the next printing layer (11);

d) choosing one of the candidate printing point obtained in step c) closest to the printing start point (211) determined in step b), to be a printing start point (211) of the next printing layer (11);

e) ensuring if a last printing layer (11) of the shielding component (2) is processed in step d); and f) executing step c) to step e) again if the last printing layer (11) of the shielding component (2) is not processed in step d).

9. The calculating method for printing start point of shielding component of 3D model of claim 8, wherein step b) randomly chooses one of all candidate printing points of the first printing layer (11) to be the printing start point (211) of the first printing layer (11), or chooses a candidate printing point closest to a right upper corner of the first printing layer (11) to be the printing start point (211) of the first printing layer (11).

* * * * *